(12) United States Patent
Du et al.

(10) Patent No.: US 12,304,430 B2
(45) Date of Patent: May 20, 2025

(54) ELECTRIC STEP DEVICE AND VEHICLE HAVING SAME

(71) Applicant: T-MAX (HANGZHOU) TECHNOLOGY CO., LTD., Zhejiang (CN)

(72) Inventors: Xinfa Du, Zhejiang (CN); Qi Zhang, Zhejiang (CN); Linjie Xu, Zhejiang (CN); Yiming Wang, Zhejiang (CN); Tao He, Zhejiang (CN); Xing Fan, Zhejiang (CN); Songfeng Wang, Zhejiang (CN)

(73) Assignee: T-MAX (HANGZHOU) TECHNOLOGY CO., LTD., Hangzhou (CN)

( * ) Notice: Subject to any disclaimer, the term of this patent is extended or adjusted under 35 U.S.C. 154(b) by 483 days.

(21) Appl. No.: 17/699,833

(22) Filed: Mar. 21, 2022

(65) Prior Publication Data

US 2023/0234511 A1 Jul. 27, 2023

(30) Foreign Application Priority Data

Jan. 11, 2022 (CN) .......................... 202210026143.4
Jan. 11, 2022 (CN) .......................... 202220065390.0

(51) Int. Cl.
*B60R 3/02* (2006.01)
(52) U.S. Cl.
CPC ...................... *B60R 3/02* (2013.01)
(58) Field of Classification Search
CPC ....................................................... B60R 3/02
See application file for complete search history.

(56) References Cited

U.S. PATENT DOCUMENTS 2,246,985 A * 6/1941 Pellegrini ................ B60R 3/02
182/97
4,106,790 A * 8/1978 Weiler ..................... B60R 3/02
280/166

(Continued)

FOREIGN PATENT DOCUMENTS

CN 206723418 U 12/2017
CN 207790503 U * 8/2018

(Continued)

OTHER PUBLICATIONS

Chinese Office Action dated Oct. 31, 2022, for Chinese Application No. 202210026143.4.

(Continued)

*Primary Examiner* — Steve Clemmons
(74) *Attorney, Agent, or Firm* — David D. Brush; Westman, Champlin & Koehler, P.A.

(57) ABSTRACT

An electric step device and a vehicle are provided. The electric step device includes a step, a retractable mechanism and an anti-collision assembly. The retractable mechanism includes a mounting seat, a step seat and an arm assembly, the step is mounted to the step seat, and the arm assembly is connected between the mounting seat and the step seat to drive the step to move between an extended position and a retracted position. The anti-collision assembly includes first and second anti-collision components, the first anti-collision component is mounted to the step and includes an anti-collision shaft, and the second anti-collision component is mounted to the mounting seat and includes an anti-collision groove. In the retracted position, the anti-collision shaft is fitted in the anti-collision groove. In the extended position, the anti-collision shaft is disengaged from the anti-collision groove.

18 Claims, 8 Drawing Sheets

(56) References Cited

U.S. PATENT DOCUMENTS

| | | | | |
|---|---|---|---|---|
| 6,663,125 B1* | 12/2003 | Cheng | ................ | B60R 3/02 |
| | | | | 280/760 |
| 8,042,821 B2* | 10/2011 | Yang | ................ | B60R 3/02 |
| | | | | 280/166 |
| 8,505,944 B2* | 8/2013 | Genest | ................ | B60R 3/02 |
| | | | | 280/166 |
| 9,688,205 B2* | 6/2017 | Du | ................ | B60R 3/02 |
| 10,124,735 B2* | 11/2018 | Du | ................ | B60R 16/023 |
| 10,384,614 B1* | 8/2019 | Du | ................ | B60R 3/02 |
| 10,618,472 B2* | 4/2020 | Du | ................ | B60R 3/02 |
| 10,821,904 B2* | 11/2020 | Du | ................ | B60R 16/023 |
| 11,414,017 B2* | 8/2022 | Qing | ................ | B60R 3/02 |
| 11,702,012 B2* | 7/2023 | Du | ................ | B60R 3/002 |
| | | | | 280/166 |
| 2008/0084045 A1* | 4/2008 | Filias | ................ | B60R 3/002 |
| | | | | 280/166 |
| 2020/0282913 A1* | 9/2020 | Qing | ................ | B60R 3/02 |
| 2022/0332254 A1* | 10/2022 | Smith | ................ | B60R 3/02 |
| 2023/0391264 A1* | 12/2023 | Miwa | ................ | B60R 3/02 |

FOREIGN PATENT DOCUMENTS

| | | | | | |
|---|---|---|---|---|---|
| CN | 109849797 A | | 6/2019 | | |
| GB | 2129378 A | * | 5/1984 | ............... | B60R 3/02 |

OTHER PUBLICATIONS

English translation of the Chinese Office Action dated Oct. 31, 2022, for Chinese Application No. 202210026143.4.
International Search Report dated Aug. 25, 2022, for International Application No. PCT/CN2022/076236.
English translation of the International Search Report dated Aug. 25, 2022, for International Application No. PCT/CN2022/076236.

* cited by examiner

ELECTRIC STEP DEVICE AND VEHICLE HAVING SAME

CROSS REFERENCES TO RELATED APPLICATIONS

The present disclosure claims the benefit of priority to Chinese Patent Application Serial Nos 202210026143.4, and 202220065390.0, filed on Jan. 11, 2022, the contents of which are incorporated herein by reference in their entireties for all purposes.

FIELD

The present disclosure relates to a technical field of vehicles, and more particularly to an electric step device and a vehicle.

BACKGROUND

A step for a vehicle is usually arranged to a chassis under a door of the vehicle for a user to get on or off. The step for the vehicle is driven by a retractable mechanism to move between an extended position and a retracted position, and the retractable mechanism is connected to the chassis of the vehicle. In the related art, the step for the vehicle is supported by the retractable mechanism at the retracted position, and the stability is poor. In addition, when the vehicle is subject to a lateral impact by a foreign object or an impact by an obstacle such as a stone from a bottom of the vehicle, a vehicle body and the step for the vehicle tend to be cracked, thereby damaging the retractable mechanism and reducing the service life. In the related art, a step device with an anti-collision mechanism is proposed. However, the anti-collision mechanism in the related art has disadvantages of a poor anti-collision performance, an unbalanced stress during impact, a complex structure and so on.

SUMMARY

An electric step device according to a first aspect of the present disclosure includes: a step; a retractable mechanism including a mounting seat, a step seat and an arm assembly, the step being mounted to the step seat, the arm assembly being connected between the mounting seat and the step seat to drive the step to move between an extended position and a retracted position; and an anti-collision assembly including a first anti-collision component and a second anti-collision component, the first anti-collision component being mounted to the step, the second anti-collision component being mounted to the mounting seat, the first anti-collision component including a first anti-collision seat and at least one anti-collision shaft, the at least one anti-collision shaft being mounted on the first anti-collision seat and spaced apart from each other, the second anti-collision component including a second anti-collision seat and at least one anti-collision groove formed in the second anti-collision seat. In the retracted position, the at least one anti-collision shaft is fitted in the at least one anti-collision groove in a one-to-one correspondence. In the extended position, the at least one anti-collision shaft is disengaged from the at least one anti-collision groove, respectively.

A vehicle according to a second aspect of the present disclosure includes a vehicle body and an electric step device. The electric step device includes: a step; a retractable mechanism including a mounting seat, a step seat and an arm assembly, the mounting seat being mounted to a bottom surface of the vehicle body, the step being mounted to the step seat, the arm assembly being connected between the mounting seat and the step seat to drive the step to move between an extended position and a retracted position; and an anti-collision assembly including a first anti-collision component and a second anti-collision component, the first anti-collision component being mounted to the step, the second anti-collision component being mounted to the mounting seat, the first anti-collision component including a first anti-collision seat and at least one anti-collision shaft, the at least one anti-collision shaft being mounted on the first anti-collision seat and spaced apart from each other, the second anti-collision component including a second anti-collision seat and at least one anti-collision groove formed in the second anti-collision seat. In the retracted position, the at least one anti-collision shaft is fitted in the at least one anti-collision groove in a one-to-one correspondence. In the extended position, the at least one anti-collision shaft is disengaged from the at least one anti-collision groove, respectively.

DETAILED DESCRIPTION

Figure 1:
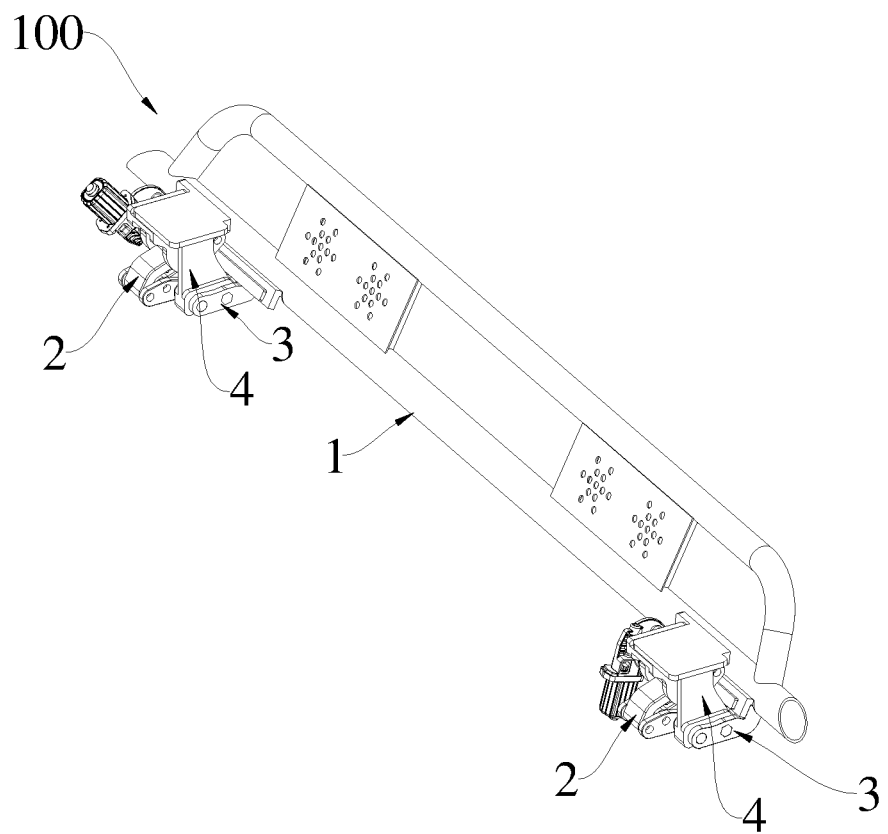
FIG. 1 is a schematic view of an electric step device according to the present disclosure, in which a step is in a retracted position.

Embodiments of the present disclosure are further described. Examples of the embodiments are illustrated in the accompanying drawings. The embodiments described below with reference to the accompanying drawings are exemplary, are intended to explain the present disclosure, and cannot be construed as limitation to the present disclosure.

A vehicle according to embodiments of the present disclosure includes a vehicle body and an electric step device 100 mounted to a bottom surface of the vehicle body. In other words, the electric step device 100 is mounted to a chassis of the vehicle body.

The vehicle includes a door, and the electric step device 100 is arranged adjacent to and below the door. In some embodiments, the vehicle includes two doors, and the two doors are side doors, which is not limited in the present disclosure. For example, in other embodiments, the vehicle may include four doors (side doors), two side doors are arranged on each side of the vehicle body, and one electric step device 100 is arranged on each side of the vehicle body. The vehicle may also include a tail door, and a tail portion of the vehicle body is provided with the electric step device 100 adjacent to the tail door.

A basic structure of the electric step device 100 with an anti-collision function according to the embodiments of the present disclosure is described below with reference to FIGS. 1 to 11. The electric step device 100 according to the embodiments of the present disclosure includes a step 1, a retractable mechanism 2 and an anti-collision assembly. The step 1 is movable between an extended position and a retracted position.

The retractable mechanism 2 includes a mounting seat 21, a step seat 22 and an arm assembly 23. The step 1 is mounted to the step seat 22, and the mounting seat 21 is configured to be mounted to the bottom surface of the vehicle body. The arm assembly 23 is connected between the mounting seat 21 and the step seat 22 to drive the step 1 to move between the extended position and the retracted position. For example, the arm assembly 23 may be pivotally connected to the mounting seat 21 and the step seat 22, respectively, and the arm assembly 23 drives the step 1 to move between the extended position and the retracted position under the drive of a driving device (such as a motor).

The anti-collision assembly includes a first anti-collision component 3 and a second anti-collision component 4. The first anti-collision component 3 is mounted to the step 1, and the second anti-collision component 4 is mounted to the mounting seat 21.

The first anti-collision component 3 includes a first anti-collision seat 31, a first anti-collision shaft 32 and a second anti-collision shaft 33. The first anti-collision shaft 32 and the second anti-collision shaft 33 are mounted on the first anti-collision seat 31 and spaced apart from each other. The second anti-collision component 4 includes a second anti-collision seat 41, a first anti-collision groove 42 and a second anti-collision groove 43. The first anti-collision groove 42 and the second anti-collision groove 43 are formed in the second anti-collision seat 41.

In the retracted position, the first anti-collision shaft 32 is fitted in the first anti-collision groove 42 and the second anti-collision shaft 33 is fitted in the second anti-collision groove 43. In the extended position, the first anti-collision shaft 32 is disengaged from the first anti-collision groove 42 and the second anti-collision shaft 33 is disengaged from the second anti-collision groove 43. In other words, in the retracted position, through the fit between the first anti-collision shaft 32 and the first anti-collision groove 42 and the fit between the second anti-collision shaft 33 and the second anti-collision groove 43, the first anti-collision component 3 is engaged with the second anti-collision component 4, so as to lock the step 1 in the retracted position. When the step 1 moves to the extended position, the first anti-collision shaft 32 is disengaged from the first anti-collision groove 42 and the second anti-collision shaft 33 is disengaged from the second anti-collision groove 43, that is, the first anti-collision component 3 is disengaged from the second anti-collision component 4, so as to allow the step 1 to move from the retracted position to the extended position.

In some other embodiments of the present disclosure, the first anti-collision component 3 may include one anti-collision shaft mounted on the first anti-collision seat 31, and the second anti-collision component 4 may include one anti-collision groove formed in the second anti-collision seat 41. In the retracted position, the anti-collision shaft is fitted in the anti-collision groove, and in the extended position, the anti-collision shaft is disengaged from the anti-collision groove.

Through the fit and disengagement of the first anti-collision shaft 32 and the first anti-collision groove 42 as well as the fit and disengagement of the second anti-collision shaft 33 and the second anti-collision groove 43, the second anti-collision component 4 locks and releases the first anti-collision component 3, so as to achieve the movement of the step 1 between the retracted position and the extended position.

It should be noted that the second anti-collision component 4 may release the first anti-collision component 3 before the step 1 leaves the retracted position, or release the first anti-collision component 3 at the same time as the step 1 leaves the retracted position, that is, the process of the disengagement of the first anti-collision component 3 from the second anti-collision component 4 may be carried out simultaneously with the process of the step 1 leaving the retracted position. The fit or disengagement of the first anti-collision shaft 32 and the first anti-collision groove 42 as well as the fit or disengagement of the second anti-collision shaft 33 and the second anti-collision groove 43 may be carried out simultaneously or sequentially, which is not limited in the present disclosure.

In some embodiments, in the retracted position, the step 1 rests against a lower edge of a side surface of the vehicle body. For example, the step 1 is oriented in a vertical direction and rests against the lower edge of the side surface of the vehicle body, such that the step 1 covers the lower edge of the vehicle body.

In other embodiments, in the retracted position, the step 1 obliquely rests against a junction of the bottom surface of the vehicle body and the side surface of the vehicle body. In other words, the step 1 is arranged obliquely with respect to the side surface of the vehicle body and rests against the junction between the bottom surface of the vehicle body and the side surface of the vehicle body, such that the step 1 can cover an outer edge of the bottom surface of the vehicle body and the lower edge of the side surface of the vehicle body. Thus, when the step 1 is locked in the retracted position by the anti-collision component, the step 1 may be used as a bumper of the vehicle to provide a protection function, thereby preventing the vehicle (for example, the vehicle body) from being impacted or scratched.

In the electric step device according to the embodiments of the present disclosure, the step is locked in the retracted position by the anti-collision assembly. The first anti-collision component and the second anti-collision component in the anti-collision assembly are fitted through two groups of shaft-groove structures to balance the force applied to the step when the step is subject to the impact by the foreign object, so as to further improve the stability of the step in the retracted position and improve the anti-collision performance of the electric step device. In addition, the anti-collision assembly may also lock and support the step in the retracted position. When the step is subject to the impact of an external force, the retractable mechanism of the electric step device may be prevented from being damaged, so as to prolong the service life of the retractable mechanism. In addition, the step in the retracted position may be used as the bumper of the vehicle to provide the protection function to a certain extent, thus preventing the vehicle from being impacted or scratched.

Figure 8:
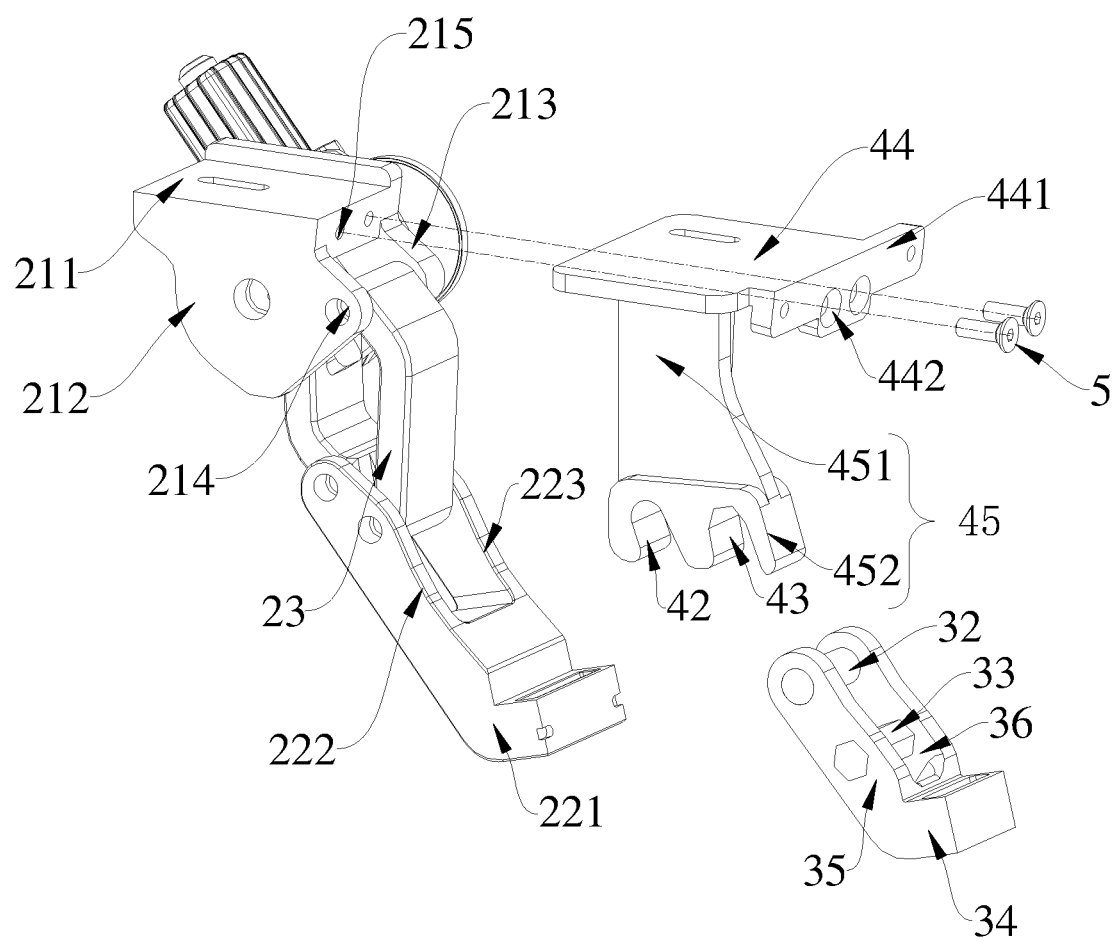
FIG. 8 is an exploded view of a retractable mechanism and an anti-collision assembly of an electric step device according to the present disclosure.

In some embodiments, as shown in FIG. 8, the mounting seat 21 includes a mounting seat plate 211, a first suspension plate 212 and a second suspension plate 213. The first suspension plate 212 extends downwards from a side of the mounting seat plate 211, the second suspension plate 213 extends downwards from another side of the mounting seat plate 211, and the first suspension plate 212 and the second suspension plate 213 are spaced apart from and opposite to each other. Specifically, the first suspension plate 212 and the second suspension plate 213 are spaced apart from each other and opposite to each other in an extension direction of the step 1. Preferably, planes of the first suspension plate 212 and the second suspension plate 213 are substantially in parallel, and the first suspension plate 212 and the second suspension plate 213 are aligned with each other in the extension direction of the step 1.

Further, an end of the arm assembly 23 is clamped between the first suspension plate 212 and the second suspension plate 213 in the extension direction of the step 1. Specifically, as shown in FIG. 8, each of the first suspension plate 212 and the second suspension plate 213 is provided with at least one mounting hole 214. The mounting hole 214 of the first suspension plate 212 is opposite to the mounting hole 214 of the second suspension plate 213 in a one-to-one correspondence in the extension direction of the step 1, and a bolt passes through the mounting holes 214 to pivotally connect the end of the arm assembly 23 with the mounting seat 21.

In some embodiments, the second anti-collision component 4 includes an anti-collision seat plate 44 and an anti-collision lug plate 45 extending downwards from the anti-collision seat plate 44. The anti-collision seat plate 44 is fixed on a top surface of the mounting seat 21, and the first anti-collision groove 41 and the second anti-collision groove 42 are formed at a lower end of the anti-collision lug plate 45.

Specifically, as shown in FIG. 8, the anti-collision seat plate 44 is fixed on a top surface of the mounting seat plate 211, and the anti-collision seat plate 44 is substantially parallel to the mounting seat plate 211. The anti-collision lug plate 45 extends downwards from a side portion of a lower surface of the anti-collision seat plate 44 and is adjacent to the first suspension plate 212, and the anti-collision lug plate 45 extends substantially parallel to the first suspension plate 212. That is, the anti-collision lug plate 45 extends downwards from the side portion of the anti-collision seat plate 44 adjacent to the first suspension plate 212. In some embodiments, the lower end of the anti-collision lug plate 45 is located below a lower end of the first suspension plate 212.

Further specifically, as shown in FIG. 8, the anti-collision lug plate 45 includes a lug plate body 451 and a lug base 452 integrated with the lug plate body 451. An upper end of the lug plate body 451 is connected to the anti-collision seat plate 44, and a lower end of the lug plate body 451 is connected to the lug base 452, that is, a lower end of the anti-collision lug plate 45 is a lower end of the lug base 452. The first anti-collision groove 42 and the second anti-collision groove 43 are formed at the lower end of the lug base 452. Both the first anti-collision groove 42 and the second anti-collision groove 43 extend along the extension direction of the step 1 and are spaced apart from each other in a first direction perpendicular to the extension direction of the step 1. It should be noted that the first direction is a horizontal direction perpendicular to the side surface of the vehicle body. As shown in FIG. 8, a thickness of the lug base 452 is greater than a thickness of the lug plate body 451. Therefore, the first anti-collision groove 42 and the second anti-collision groove 43 have certain dimensions in their extension directions, which increases their contact areas with the first anti-collision shaft 32 and the second anti-collision shaft 33, further improves the reliability of the second anti-collision component 4 locking the first anti-collision component 3, and improves the stability of the step 1 in the retracted position.

In some embodiments, as shown in FIG. 8, the first anti-collision groove 42 and the second anti-collision groove 43 are aligned in the horizontal direction, that is, relative heights of the first anti-collision groove 42 and the second anti-collision groove 43 are consistent. In some embodiments, the first anti-collision groove 42 and the second anti-collision groove 43 may have a certain height difference in an up-down direction. For example, the first anti-collision groove 42 may be located above or below the second anti-collision groove 43. In some embodiments, the relative position relationship between the first anti-collision groove 42 and the second anti-collision groove 43 may be arranged according to a movement manner of the step seat 22. For example, by designing the relative position relationship between the first anti-collision groove 42 and the second anti-collision groove 43, the disengagement (fit or engagement) of the first anti-collision shaft 32 and the first anti-collision groove 42, as well as the disengagement (fit or engagement) of the second anti-collision shaft 33 and the second anti-collision groove 43 can be carried out simultaneously.

In some embodiments, in order to mount the anti-collision seat plate 44 on the mounting seat 21, an outer side surface of the anti-collision seat plate 44 is integrally provided with a folded plate portion 441, the folded plate portion 441 has a connecting through hole 442, and an outer side surface of the mounting seat 21 has a threaded hole 215. The anti-collision seat plate 44 is fastened to the mounting seat 21 through a threaded piece 5 which passes through the connecting through hole 442 to be fitted in the threaded hole 215.

Specifically, as shown in FIG. 8, a side of the anti-collision seat plate 44 adjacent to the step 1, that is, an outer side of the anti-collision seat plate 44, is provided with the folded plate portion 441, and the folded plate portion 441 extends downwards from such side of the anti-collision seat plate 44. The folded plate portion 441 has two connecting through holes 442 spaced apart from each other along the extension direction of the step 1. It may be understood that the connecting through holes 442 are located below the lower surface of the anti-collision seat plate 44. An outer side surface of the mounting seat plate 211 of the mounting seat 21 adjacent to the folded plate portion 441 has two threaded holes 215, and the two threaded holes 215 are in a one-to-one correspondence with the two connecting through holes 442 in the length direction of the step 1. The two threaded pieces 5 pass through the connecting through holes 442 from an outer side to an inner side to be fitted in the threaded holes 215, such that the anti-collision seat plate 44 and the mounting seat plate 211 are fixed to each other.

In some embodiments, the first anti-collision component 3 includes a connecting seat 34, a first lug plate 35, and a second lug plate 36. The connecting seat 34 is connected to the step 1, an end of the first lug plate 35 is connected to the connecting seat 34, an end of the second lug plate 36 is connected to the connecting seat 34, and the first lug plate 35 and the second lug plate 36 are opposite to and spaced apart from each other. Specifically, in the embodiment shown in FIG. 8, the first lug plate 35 and the second lug plate 36 are spaced apart from and opposite to each other in the extension direction of the step 1, and planes of the first lug plate 35 and the second lug plate 36 are substantially in parallel.

A first end of the first anti-collision shaft 32 is supported on the first lug plate 35, a second end of the first anti-collision shaft 32 is supported on the second lug plate 36, a first end of the second anti-collision shaft 33 is supported on the first lug plate 35, a second end of the second anti-collision shaft 33 is supported on the second lug plate 36, and the first anti-collision shaft 32 and the second anti-collision shaft 33 are spaced apart from each other along the extension direction of the first lug plate 35 and the second lug plate 36.

Figure 2:
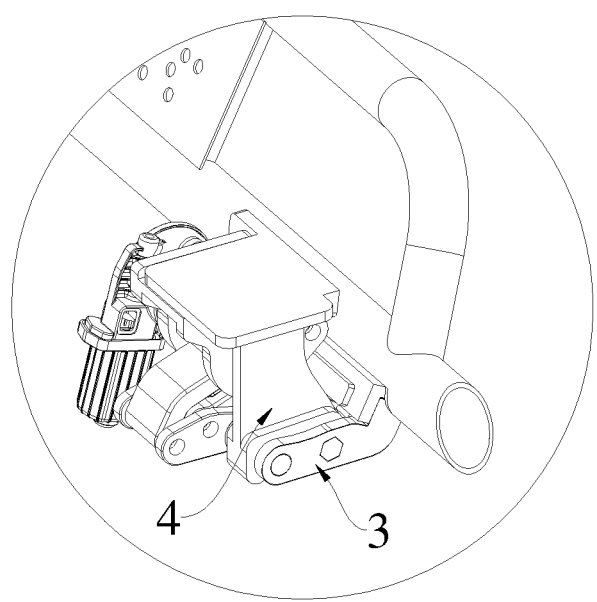
FIG. 2 is a partially enlarged view of the electric step device in FIG. 1.
Figure 3:
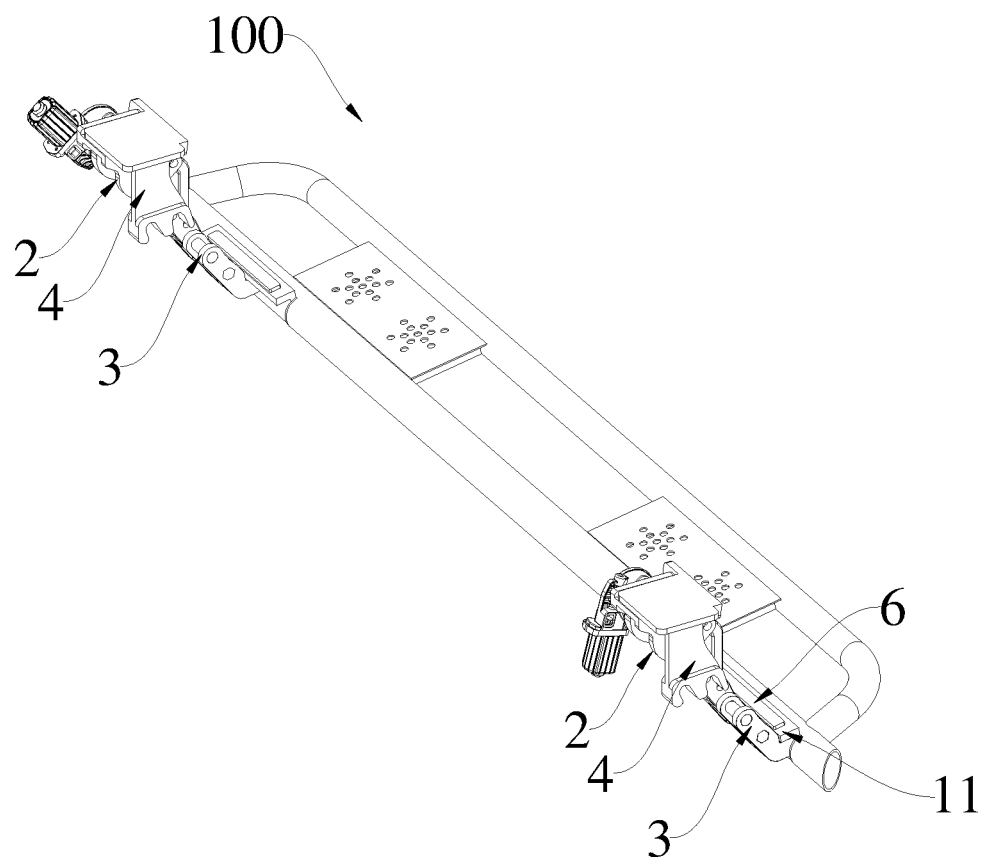
FIG. 3 is another schematic view of an electric step device according to the present disclosure, in which a step is in an extended position.
Figure 4:
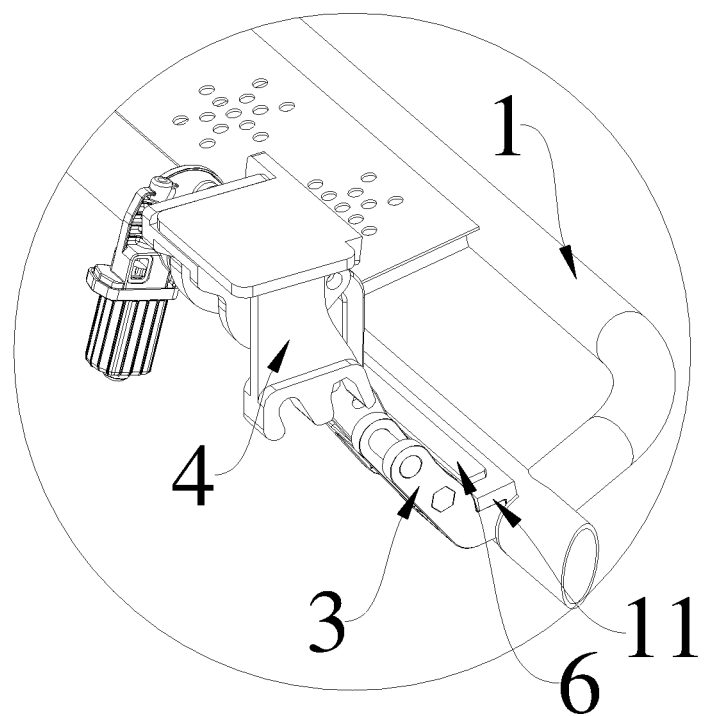
FIG. 4 is a partially enlarged view of the electric step device in FIG. 3.
Figure 5:
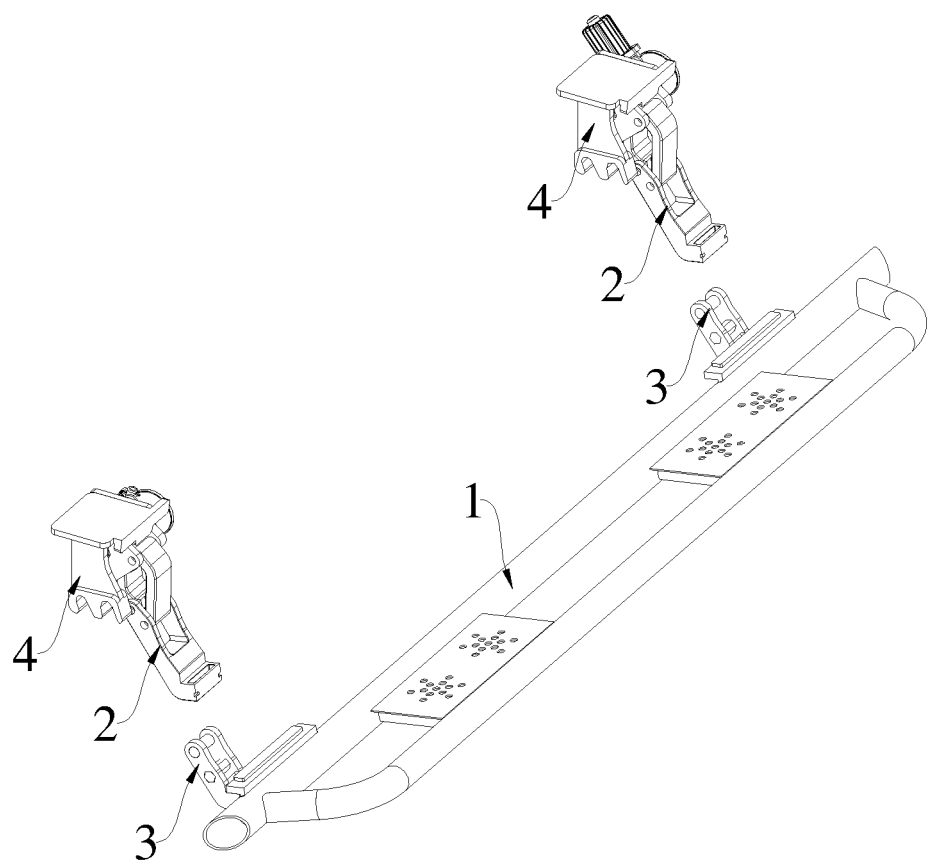
FIG. 5 is an exploded view of an electric step device according to the present disclosure.
Figure 6:
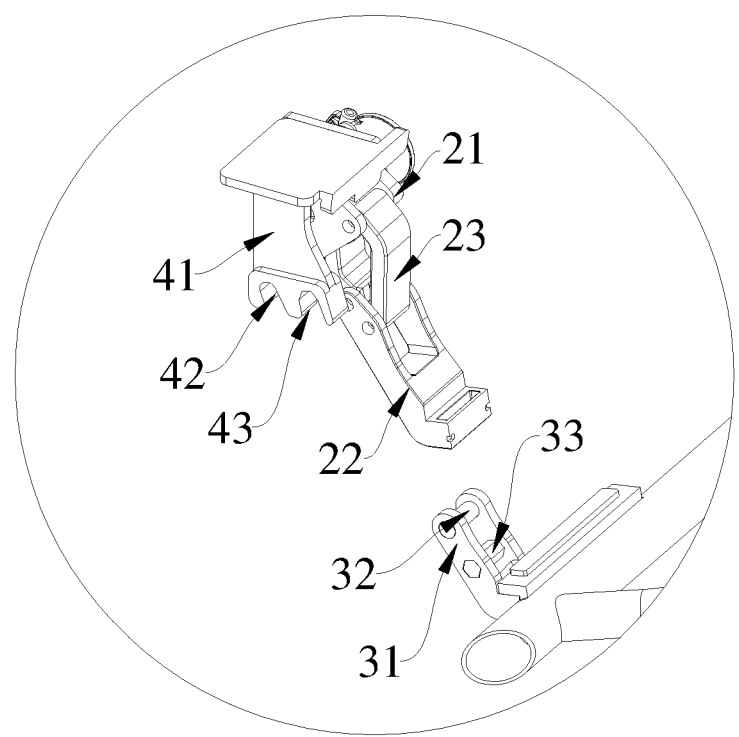
FIG. 6 is a partially enlarged view of the electric step device in FIG. 5.

As shown in FIG. 3 and FIG. 4, in the extended position, the first lug plate 35 and the second lug plate 36 extend upwards and inwards from the connecting seat 34, that is, towards the second anti-collision component 4. As shown in FIG. 1 and FIG. 2, in the retracted position, the first lug plate 35 and the second lug plate 36 extend inwards horizontally from the connecting seat 34 to be fitted with the lower end of the lug base 452.

In some embodiments, an outer peripheral contour of a cross section of the first anti-collision shaft 32 is adapted to an inner peripheral contour of the first anti-collision groove 42, and an outer peripheral contour of a cross section of the second anti-collision shaft 33 is adapted to an inner peripheral contour of the second anti-collision groove 43, such that in the retracted position, the first anti-collision shaft 32 is better engaged in the first anti-collision groove 42, and the second anti-collision shaft 33 is better engaged in the second anti-collision groove 43.

In some embodiments, the cross section of the first anti-collision shaft 32 (the second anti-collision shaft 33) has a circular shape, and the inner peripheral contour of the first anti-collision groove 42 (the second anti-collision groove 43) also has a circular shape. Or, the cross section of the first anti-collision shaft 32 (the second anti-collision shaft 33) has a non-circular shape, and the inner peripheral contour of the first anti-collision groove 42 (the second anti-collision groove 43) also has a non-circular shape, for example a polygon such as a quadrilateral, a hexagon, etc.

In some embodiments, the cross-sections of the first anti-collision shaft 32 and the second anti-collision shaft 33 have different shapes. For example, in the embodiment shown in FIG. 8, the cross-section of the first anti-collision shaft 32 has a circular shape, the cross-section of the second anti-collision shaft 33 has a regular hexagonal shape, the inner peripheral contour of the first anti-collision groove 42 has a circular shape adapted to the cross-section of the first anti-collision shaft 32, and the inner peripheral contour of the second anti-collision groove 43 has a regular hexagonal shape adapted to the cross section of the second anti-collision shaft 33. It may be understood that the shapes of the cross sections of the first anti-collision shaft 32 and the second anti-collision shaft 33 are not limited to this. In some embodiments, the cross section of the second anti-collision shaft 33 has a shape of another regular polygon. Since the cross sections of the first anti-collision shaft 32 and the second anti-collision shaft 33 have different shapes, a degree of the anti-collision assembly locking the step 1 in the retracted position can be further improved, thus improving the stability of the step 1.

Figure 7:
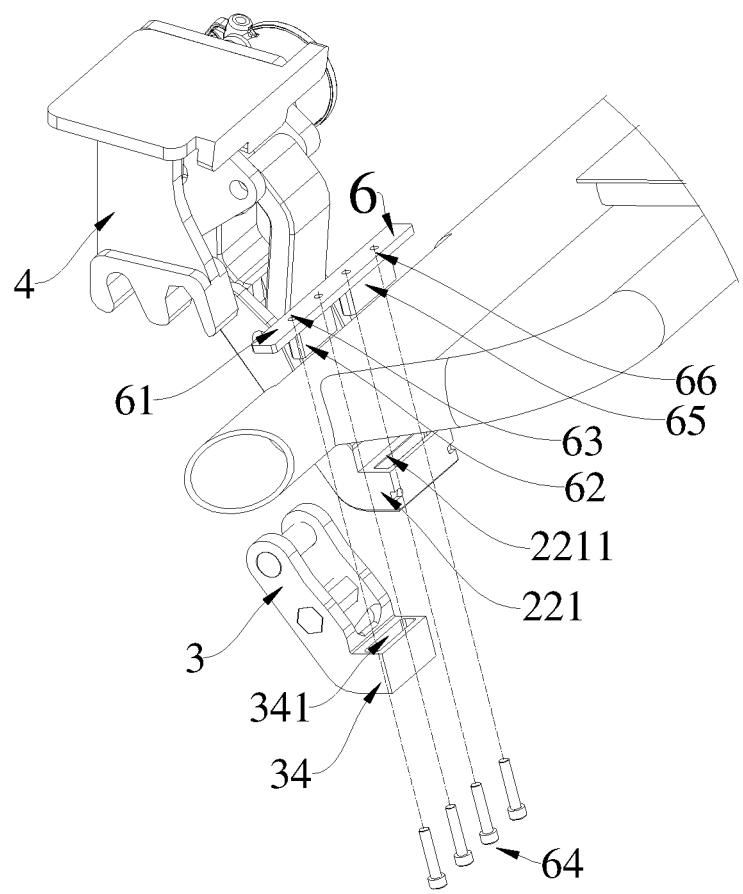
FIG. 7 is a partially exploded view of an electric step device according to the present disclosure.

In some embodiments, in order to connect the connecting seat with the step 1, the electric step device 100 further includes a pressing plate 6. As shown in FIG. 7, the pressing plate 6 includes a plate body 61 and a first boss 62 extending downwards from a lower surface of the plate body 61. The pressing plate 6 has a first threaded hole 63 running through the plate body 61 and the first boss 62. An inner side of the step 1 is provided with a connecting plate 11, the connecting plate 11 has a first penetrating hole, the connecting seat 34 has a first groove 341, a bottom wall of the first groove 341 has a first through hole (not shown), the connecting plate 11 is pressed on the connecting seat 34, the plate body 61 is pressed on the connecting plate 11, and the first boss 62 passes through the first penetrating hole to be fitted in the first groove 341. Thus, the pressing plate 6, the connecting seat 34 and the step 1 are fastened together by a threaded fastener 64 which passes through the first through hole to be fitted in the first threaded hole 63.

The step seat 22 includes a step seat body 221, a first step seat lug 222 and a second step seat lug 223. The first step seat lug 222 and the second step seat lug 223 are integrally connected to the step seat body 221, and the first step seat lug 222 and the second step seat lug 223 are opposite to and spaced apart from each other in the extension direction of the step 1. Specifically, as shown in FIG. 8, an end of the first step seat lug 222 is connected to the step seat body 221 and extends towards the arm assembly 23, an end of the second step seat lug 223 is connected to the step seat body 221 and extends towards the arm assembly 23, and a lower end of the arm assembly 23 is located between the first step seat lug 222 and the second step seat lug 223 and is pivotally connected to the first step seat lug 222 and the second step seat lug 223.

In some embodiments, as shown in FIG. 7, in order to connect the step seat 22 with the step 1, the step seat body 221 has a second groove 2211, a bottom wall of the second groove 2211 has a second through hole (not shown), and the pressing plate 6 further includes a second boss 65 extending downwards side by side with the first boss 62 from the lower surface of the plate body 61. The pressing plate 6 also has a second threaded hole 66 which runs through the plate body 61 and the second boss 65, the connecting plate 11 has a second penetrating hole (not shown), the connecting plate 11 is pressed on the step seat body 221, the plate body 61 is pressed on the connecting plate 11, the second boss 65 passes through the second penetrating hole to be fitted in the second groove 2211, and the pressing plate 6 is also fastened by another threaded fastener 64 which passes through the second through hole to be fitted in the second threaded hole 66. In other words, the pressing plate 6, the step 1 and the step seat 22 are fastened together by the threaded fastener 64 which passes through the second through hole to be fitted in the second threaded hole 66.

As an example, as shown in FIG. 7, the lower surface of the plate body 61 of the pressing plate 6 is connected to the first boss 62 and the second boss 65, and the first boss 62 and the second boss 65 are spaced apart in the extension direction of the step 1. Two first threaded holes 63 are provided, the two first threaded holes 63 are spaced apart in the extension direction of the step 1, two second threaded holes 66 are provided, and the two second threaded holes 66 are spaced apart in the extension direction of the step 1. The first boss 62 and the second boss 65 are rectangle-like structures, and the first groove 341 and the second groove 2211 are rectangle-like grooves adapted to the first boss 62 and the second boss 65.

It should be noted that in other embodiments, two pressing plates 6 may be provided, one of the two pressing plates 6 includes the first boss 62 and the other of the two pressing plates 6 includes the second boss 65, that is, the first boss 62 and the second boss 65 are designed to be separate. In addition, the connecting seat 34 may also be connected to the step 1 in other ways, such as being directly connected to the connecting plate 11 of the step 1 through a fixing bolt. The step seat 22 may also be connected to the step 1 in other ways, such as being directly connected to the connecting plate 11 of the step 1 through a fixing bolt. In some embodiments, the connecting seat 34 and the step seat 22 may be integrally formed with the step 1.

In some embodiments, two retractable mechanisms 2 are provided and spaced apart along a length direction of the step 1, and the anti-collision assembly corresponds to at least one of the retractable mechanisms 2. In other words, the anti-collision component may correspond to the two retractable mechanisms 2 or merely correspond to one retractable mechanism 2.

In some embodiments, the arm assembly 23 may be a four-bar linkage, a five-bar linkage, or a six-bar linkage.

Figure 9:
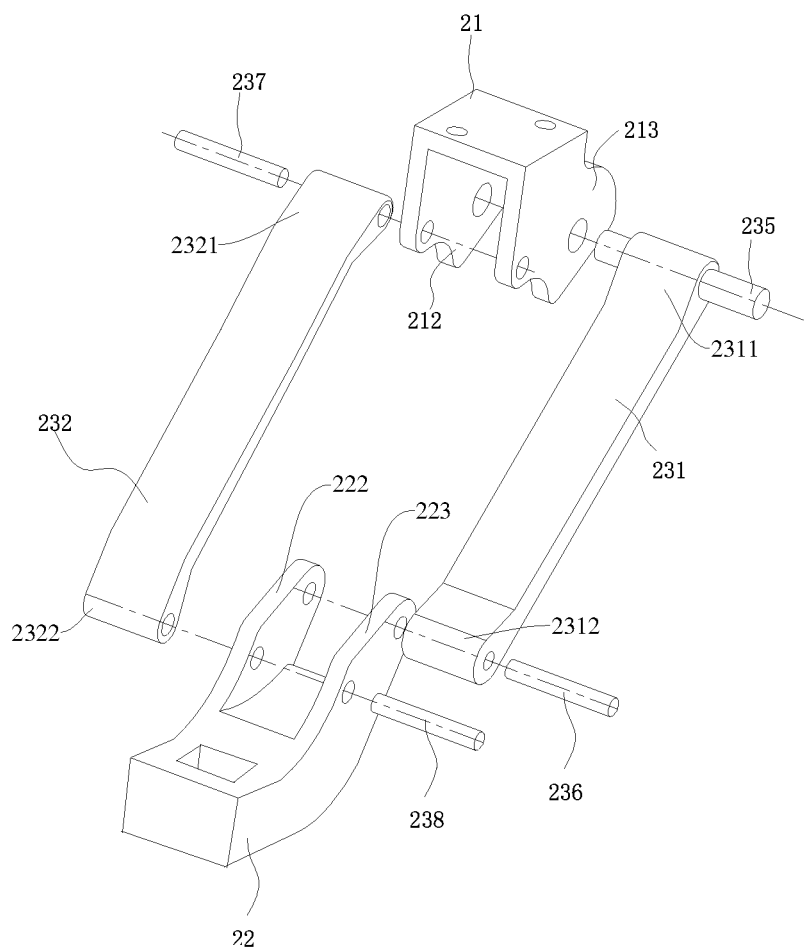
FIG. 9 is a perspective view of a retractable mechanism in a form of a four-bar linkage according to the present disclosure.

Specifically, as shown in FIG. 9, the arm assembly 23 is a four-bar linkage. The arm assembly 23 includes a first arm 231 and a second arm 232. A first end 2311 of the first arm 231 is pivotally connected to the mounting seat 21, a second end 2312 of the first arm 231 is pivotally connected to the step seat 22, a first end 2321 of the second arm 232 is pivotally connected to the mounting seat 21, and a second end 2322 of the second arm 232 is pivotally connected to the step seat 22.

The arm assembly 23 further includes a first pin shaft 235, a second pin shaft 236, a third pin shaft 237, and a fourth pin shaft 238. The first arm 231 has an upper end and a lower end, the upper end of the first arm 231 is pivotally connected to the mounting seat 21 through the first pin shaft 235, and the lower end of the first arm 231 is pivotally connected to the step seat 22 through the second pin shaft 236. An upper end of the second arm 232 is pivotally connected to the mounting seat 21 through the third pin shaft 237, and a lower end of the second arm 232 is pivotally connected to the step seat 22 through the fourth pin shaft 238.

Specifically, the second end 2312 of the first arm 231 is clamped between the first step seat lug 222 and the second step seat lug 223, and the second pin shaft 236 sequentially passes through one of the first step seat lug 222 and the second step seat lug 223, the second end 2312 of the first arm 231 and the other one of the first step seat lug 222 and the second step seat lug 223, such that the second end 2312 of the first arm 231 is pivotally connected to the step seat 22. The second end 2322 of the second arm 232 is clamped between the first step seat lug 222 and the second step seat lug 223, and the fourth pin shaft 238 sequentially passes through one of the first step seat lug 222 and the second step seat lug 223, the second end 2322 of the second arm 232 and the other one of the first step seat lug 222 and the second step seat lug 223, such that the second end 2322 of the second arm 232 is pivotally connected to the step seat 22.

Figure 10:
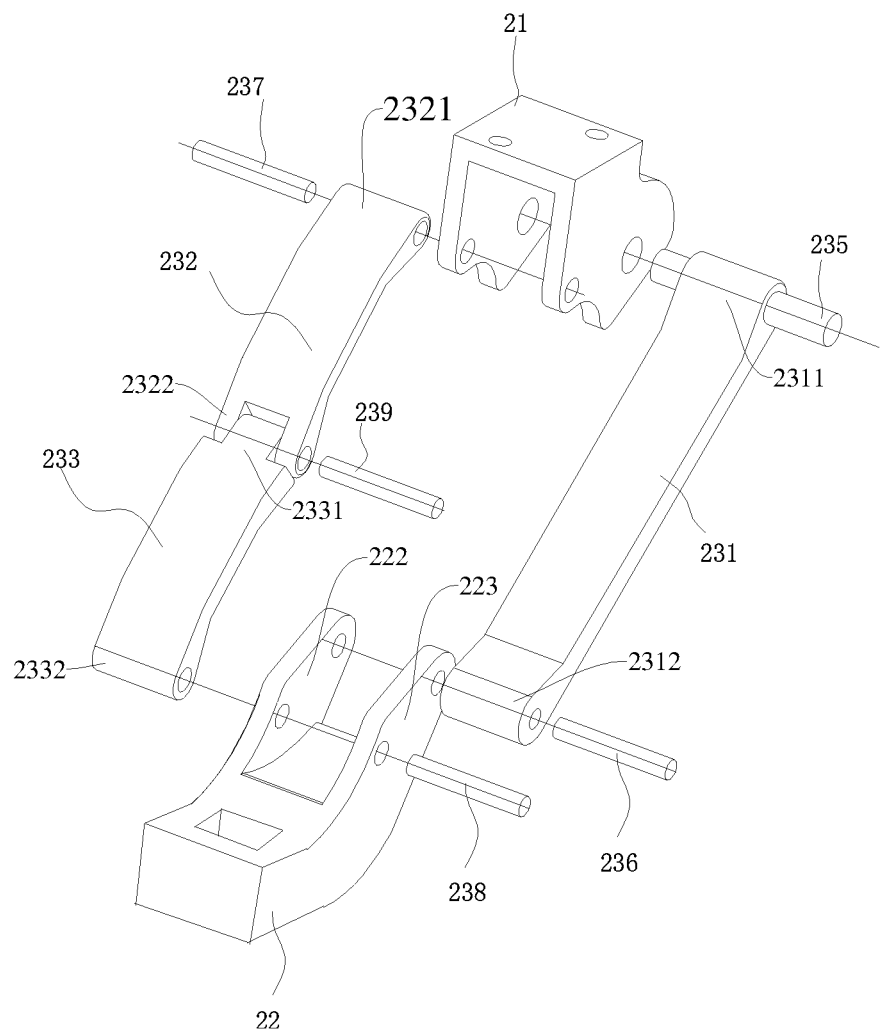
FIG. 10 is a perspective view of a retractable mechanism in a form of a five-bar linkage according to the present disclosure.

As shown in FIG. 10, the arm assembly 23 is a five-bar linkage. The arm assembly 23 includes a first arm 231, a second arm 232, and a third arm 233. A first end 2311 of the first arm 231 is pivotally connected to the mounting seat 21, a second end 2312 of the first arm 231 is pivotally connected to the step seat 22, a first end 2321 of the second arm 232 is pivotally connected to the mounting seat 22, a first end 2331 of the third arm 233 is pivotally connected to a second end 2322 of the second arm 232, and a second end 2332 of the third arm 233 is pivotally connected to the step seat 22.

The arm assembly 23 further includes a first pin shaft 235, a second pin shaft 236, a third pin shaft 237, a fourth pin shaft 238 and a fifth pin shaft 239. The first arm 231 has an upper end and a lower end. The upper end of the first arm 231 is pivotally connected to the mounting seat 21 through the first pin shaft 235, and the lower end of the first arm 231 is pivotally connected to the step seat 22 through the second pin shaft 236. The second arm 232 has an upper end and a lower end, and the upper end of the second arm 232 is pivotally connected to the mounting seat 21 through the third pin shaft 237. The third arm 233 has an upper end and a lower end. The lower end of the second arm 232 is pivotally connected to the upper end of the third arm 233 through the fifth pin shaft 239, and the lower end of the third arm 233 is pivotally connected to the step seat 22 through the fourth pin shaft 238.

Figure 11:
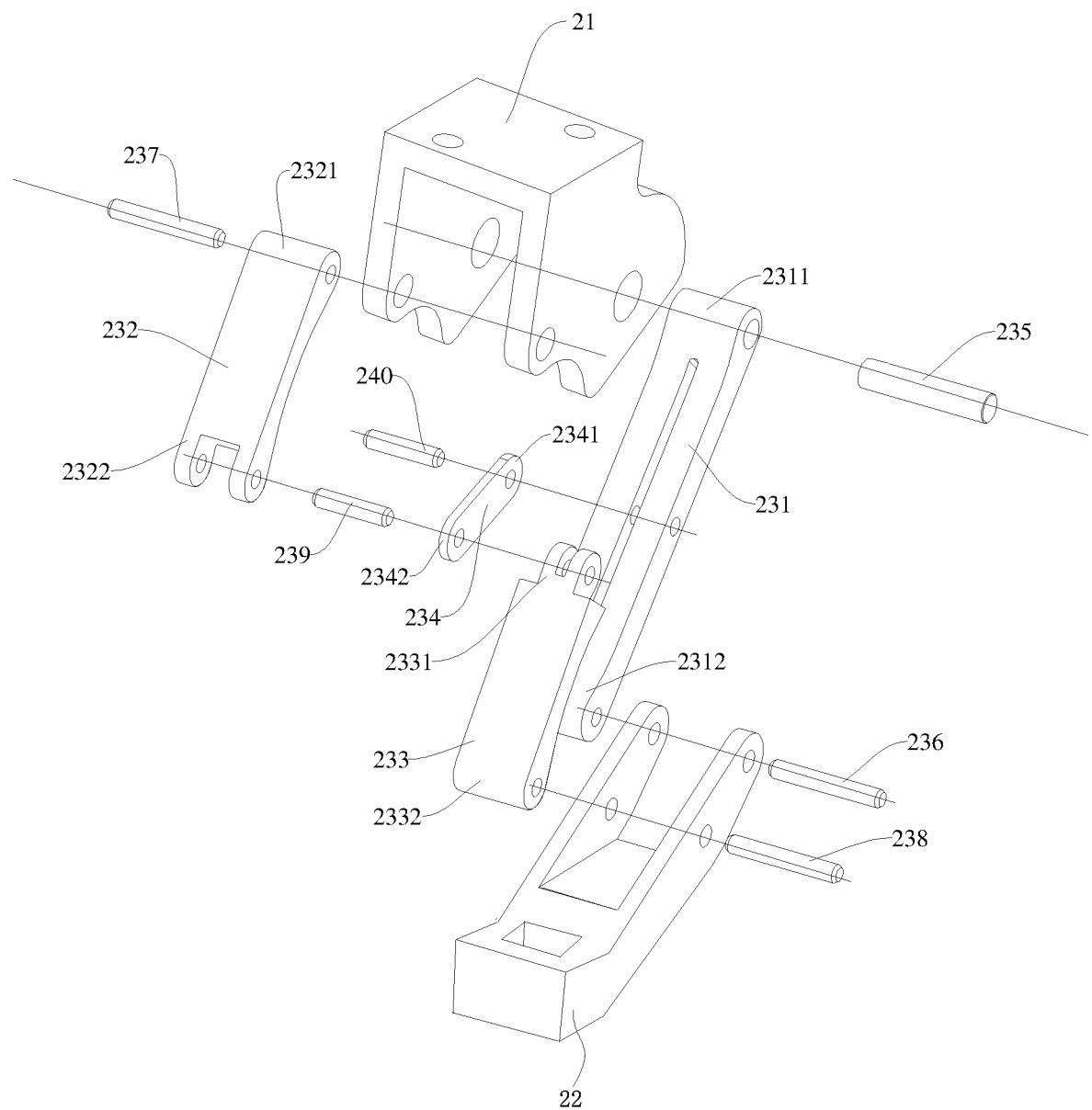
FIG. 11 is a perspective view of a retractable mechanism in a form of a six-bar linkage according to the present disclosure.

As shown in FIG. 11, the arm assembly 23 is a six-bar linkage. The arm assembly 23 includes a first arm 231, a second arm 232, a third arm 233, and a fourth arm 234. A first end 2311 of the first arm 231 is pivotally connected to the mounting seat 21, a second end 2312 of the first arm 231 is pivotally connected to the step seat 22, and a first end 2321 of the second arm 232 is pivotally connected to the mounting seat 21. A first end 2331 of the third arm 233 is pivotally connected to a second end 2322 of the second arm 232, a second end 2332 of the third arm 233 is pivotally connected to the step seat 22, a first end 2341 of the fourth arm 234 is pivotally connected to the first arm 231, and a second end 2342 of the fourth arm 234 is pivotally connected to at least one of the second arm 232 and the third arm 233.

It may be understood by those skilled in the art that the second end 2342 of the fourth arm 234 may be pivotally connected to the second arm 232, or may be pivotally connected to the third arm 233, or may be pivotally connected to the second arm 232 and the third arm 233.

As shown in FIG. 11, the arm assembly 23 further includes a first pin shaft 235, a second pin shaft 236, a third pin shaft 237, a fourth pin shaft 238, a fifth pin shaft 239, and a sixth pin shaft 240. The first arm 231 has an upper end and a lower end. The upper end of the first arm 231 is pivotally connected to the mounting seat 21 through the first pin shaft 235, and the lower end of the first arm 231 is pivotally connected to the step seat 22 through the second pin shaft 236. The second arm 232 has an upper end and a lower end. The upper end of the second arm 232 is pivotally connected to the mounting seat 21 through the third pin shaft 237.

The third arm 233 has an upper end and a lower end, and the lower end of the third arm 233 is pivotally connected to the step seat 22 through the fourth pin shaft 238. The fourth arm 234 has a first end and a second end. The second end of the fourth arm 234 is pivotally connected to the lower end of the second arm 232 and the upper end of the third arm 233 through the fifth pin shaft 239, and the first end of the fourth arm 234 is pivotally connected to a middle portion of the first arm 231 through the sixth pin shaft 240.

In the arm assemblies 23 shown in FIGS. 10 and 11, the second end 2312 of the first arm 231 is clamped between the first step seat lug 222 and the second step seat lug 223, and the second pin shaft 236 sequentially passes through one of the first step seat lug 222 and the second step seat lug 223, the second end 2312 of the first arm 231 and the other one of the first step seat lug 222 and the second step seat lug 223, such that the second end 2312 of the first arm 231 is pivotally connected to the step seat 22. The second end 2332 of the third arm 233 is clamped between the first step seat lug 222 and the second step seat lug 223, and the fourth pin shaft 238 sequentially passes through one of the first step seat lug 222 and the second step seat lug 223, the second end 2332 of the third arm 233 and the other one of the first step seat lug 222 and the second step seat lug 223, such that the second end 2332 of the third arm 233 is pivotally connected to the step seat 22.

In some embodiments, there are a plurality of retractable mechanisms 2 and a plurality of anti-collision assemblies. The plurality of retractable mechanisms 2 are in a one-to-one correspondence with the plurality of anti-collision assemblies to further improve the stability of driving the step 1 to move and/or keeping the step 1 static. In some embodiments, through the plurality of retractable mechanisms 2 and the plurality of anti-collision assemblies, the stability of the step 1 in the retracted position and the smoothness of the step 1 during movements are further improved. It should be understood that term "a plurality of" means at least two, such as two, three, and the like, unless specified otherwise.

Specifically, as shown in FIG. 1-5, the electric step device 100 for the vehicle includes two retractable mechanisms 2 and two anti-collision assemblies. The retractable mechanism 2 is connected to a bottom portion of the vehicle body and the step 1. The anti-collision assembly includes the first anti-collision component 3 and the second anti-collision component 4 corresponding to each other, the first anti-collision component 3 is mounted to the step 1, the second anti-collision component 4 is mounted to the mounting seat 21, and the mounting seat 21 is arranged at the bottom portion of the vehicle body. In the retracted position, the two first anti-collision components 3 may be engaged with and disengaged from the corresponding two second anti-collision components 4, respectively. One anti-collision assembly, one retractable mechanism 2, the other retractable mechanism 2 and the other anti-collision assembly are spaced apart along the length direction of the step 1, and one anti-collision assembly is adjacent to one retractable mechanism 2 and the other anti-collision assembly is adjacent to the other retractable mechanism 2.

In the descriptions of the embodiments of the present disclosure, it is to be understood that, terms such as "center", "longitudinal", "lateral", "length", "width", "thickness", "upper", "lower", "front", "rear", "left", "right", "vertical", "horizontal", "top", "bottom", "inner", "outer", "clockwise" and "counterclockwise" should be construed to refer to the orientation or position relationship based on the orientation or position relationship illustrated in the drawings, are only used to describe the present disclosure and simplify description, and do not indicate or imply that the device or element referred to must have a particular orientation or be configured or operate in a specific orientation, which cannot be construed as a limitation to the present disclosure.

In addition, terms such as "first" and "second" are used herein for purposes of description and are not intended to indicate or imply relative importance or significance or to imply the number of indicated technical features. Thus, the feature defined with "first" and "second" may comprise at least one of this feature. In the description of the present disclosure, "a plurality of" means at least two, such as two, three, and the like, unless specified otherwise.

In the present disclosure, it should be noted, unless specified or limited otherwise, the terms "mounted," "connected," "coupled" "fixed" or the like are used broadly. The terms may indicate, for example, fixed connections, detachable connections, or integral connections, may also indicate mechanical or electrical connections or mutual communication, may also indicate direct connections or indirect connections via intermediate mediums, and may also indicate inner communications of two elements or the interaction between two elements. The specific meanings of the terms in embodiments of the present disclosure may be understood by those skilled in the art according to particular circumstances.

In the descriptions of the present disclosure, it should be noted that, unless otherwise expressly specified and limited, the first feature "on" or "under" the second feature may be that the first and second features are in direct contact, or that the first and second features are in indirect contact through an intermediate medium. Moreover, the first feature "up", "above" and "on" the second feature may be that the first feature is directly above or obliquely above the second feature, or merely be that the first feature has a level higher than the second feature. The first feature "down", "below" and "under" the second feature may be that the first feature is directly below or obliquely below the second feature, or merely be that the first feature has a level less than the second feature.

Reference throughout the present disclosure to terms "one embodiment," "some embodiments," "an example", "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Moreover, the particular features, structures, materials, or characteristics described may be combined in any suitable manner in one or more embodiments or examples. Furthermore, in the case of non-contradiction, those skilled in the art may combine and group the different embodiments or examples described in this specification and the features of the different embodiments or examples.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from the scope of the present disclosure.

The invention claimed is:

1. An electric step device, comprising:
   a step;
   a retractable mechanism comprising a mounting seat, a step seat and an arm assembly, the step being mounted to the step seat, the arm assembly being connected between the mounting seat and the step seat to drive the step to move between an extended position and a retracted position; and
   an anti-collision assembly comprising a first anti-collision component and a second anti-collision component, the first anti-collision component being mounted to the step, the second anti-collision component being mounted to the mounting seat, the first anti-collision component comprising a first anti-collision seat and at least two anti-collision shafts, the at least two anti-collision shafts being mounted on the first anti-collision seat and spaced apart from each other, the second anti-collision component comprising a second anti-collision seat and at least two anti-collision grooves formed in the second anti-collision seat,
   wherein in the retracted position, the at least two anti-collision shafts are fitted in the at least two anti-collision grooves in a one-to-one correspondence, and in the extended position, the at least two anti-collision shafts are disengaged from the at least two anti-collision grooves, respectively;

wherein the second anti-collision component further comprises an anti-collision seat plate and an anti-collision lug plate extending downwards from the anti-collision seat plate, the anti-collision seat plate is fixed on a top surface of the mounting seat, and the at least two anti-collision grooves are formed at a lower end of the anti-collision lug plate.

2. The electric step device according to claim 1, wherein the anti-collision lug plate extends downwards from a side portion of a lower surface of the anti-collision seat plate, and comprises a lug plate body and a lug base integrated with the lug plate body, an upper end of the lug plate body is connected to the anti-collision seat plate, a lower end of the lug plate body is connected to the lug base, the at least two anti-collision grooves are formed at a lower end of the lug base, and a thickness of the lug base is greater than a thickness of the lug plate body.

3. The electric step device according to claim 1, wherein an outer side surface of the anti-collision seat plate is integrally provided with a folded plate portion, the folded plate portion has a connecting through hole, an outer side surface of the mounting seat has a threaded hole, and the anti-collision seat plate is fastened to the mounting seat through a threaded piece which passes through the connecting through hole to be fitted in the threaded hole.

4. The electric step device according to claim 1, wherein the mounting seat comprises a mounting seat plate, a first suspension plate and a second suspension plate, the first suspension plate extends downwards from a side of the mounting seat plate, the second suspension plate extends downwards from another side of the mounting seat plate, the first suspension plate and the second suspension plate are spaced apart from and opposite to each other, the anti-collision lug plate is adjacent to the first suspension plate and extends substantially parallel to the first suspension plate.

5. The electric step device according to claim 1, wherein the first anti-collision seat comprises a connecting seat, a first lug plate, and a second lug plate, the connecting seat is connected to the step, an end of the first lug plate is connected to the connecting seat, an end of the second lug plate is connected to the connecting seat, the first lug plate and the second lug plate are opposite to and spaced apart from each other, a first end of the at least two anti-collision shafts is supported on the first lug plate, a second end of the at least two anti-collision shafts is supported on the second lug plate, and the at least two anti-collision shafts are spaced apart from each other along an extension direction of the first lug plate and the second lug plate.

6. The electric step device according to claim 5, further comprising a pressing plate, wherein the pressing plate comprises a plate body and a first boss extending downwards from a lower surface of the plate body, the pressing plate has a first threaded hole running through the plate body and the first boss, an inner side of the step is provided with a connecting plate, the connecting plate has a first penetrating hole, the connecting seat has a first groove, a bottom wall of the first groove has a first through hole, the connecting plate is pressed on the connecting seat, the plate body is pressed on the connecting plate, the first boss passes through the first penetrating hole to be fitted in the first groove, and the pressing plate, the connecting seat and the step are fastened together by a threaded fastener which passes through the first through hole to be fitted in the first threaded hole.

7. The electric step device according to claim 6, wherein the step seat comprises a step seat body, a first step seat lug and a second step seat lug, the first step seat lug and the second step seat lug are integrally connected to the step seat body, and opposite to and spaced apart from each other, the step seat body has a second groove, a bottom wall of the second groove has a second through hole, the pressing plate further comprises a second boss extending downwards side by side with the first boss from the lower surface of the plate body, the pressing plate has a second threaded hole running though the plate body and the second boss, the connecting plate has a second penetrating hole, the connecting plate is pressed on the step seat body, the plate body is pressed on the connecting plate, the second boss passes through the second penetrating hole to be fitted in the second groove, and the pressing plate, the step and the step seat are fastened together by another threaded fastener which passes through the second through hole to be fitted in the second threaded hole.

8. The electric step device according to claim 1, wherein the arm assembly comprises a first arm and a second arm such that the retractable mechanism is a four-bar linkage.

9. The electric step device according to claim 1, wherein the arm assembly comprises a first arm, a second arm and a third arm such that the retractable mechanism is a five-bar linkage.

10. The electric step device according to claim 1, wherein the arm assembly comprises a first arm, a second arm, a third arm and a fourth arm such that the retractable mechanism is a six-bar linkage.

11. The electric step device according to claim 1, wherein two retractable mechanisms are provided and spaced apart along a length direction of the step, and the anti-collision assembly corresponds to at least one of the two retractable mechanisms.

12. The electric step device according to claim 1, wherein the at least two anti-collision shafts comprise a first anti-collision shaft and a second anti-collision shaft, the at least two anti-collision grooves comprise a first anti-collision groove and a second anti-collision groove, a cross section of the first anti-collision shaft has a circular shape, a cross section of the second anti-collision shaft has a polygonal shape, a shape of a cross section of the first anti-collision groove is adapted to the shape of the cross section of the first anti-collision shaft, and a shape of a cross section of the second anti-collision groove is adapted to the shape of the cross section of the second anti-collision shaft.

13. A vehicle, comprising:
a vehicle body; and
an electric step device comprising:
  a step;
  a retractable mechanism comprising a mounting seat, a step seat and an arm assembly, the mounting seat being mounted to a bottom surface of the vehicle body, the step being mounted to the step seat, the arm assembly being connected between the mounting seat and the step seat to drive the step to move between an extended position and a retracted position; and
  an anti-collision assembly comprising a first anti-collision component and a second anti-collision component, the first anti-collision component being mounted to the step, the second anti-collision component being mounted to the mounting seat, the first anti-collision component comprising a first anti-collision seat and at least two anti-collision shafts, the at least two anti-collision shafts being mounted on the first anti-collision seat and spaced apart from each other, the second anti-collision component comprising a second anti-collision seat and at least two anti-collision grooves formed in the second anti-collision seat, wherein in the retracted position, the at least two anti-collision shafts are fitted in the at least two anti-collision grooves in a one-to-one correspondence, and in the extended position, the at least two anti-collision shafts are disengaged from the at least two anti-collision grooves, respectively;

wherein the second anti-collision component further comprises an anti-collision seat plate and an anti-collision lug plate extending downwards from the anti-collision seat plate, the anti-collision seat plate is fixed on a top surface of the mounting seat, and the at least two anti-collision grooves are formed at a lower end of the anti-collision lug plate.

14. The vehicle according to claim 13, wherein the anti-collision lug plate extends downwards from a side portion of a lower surface of the anti-collision seat plate, and comprises a lug plate body and a lug base integrated with the lug plate body, an upper end of the lug plate body is connected to the anti-collision seat plate, a lower end of the lug plate body is connected to the lug base, the at least two anti-collision grooves are formed at a lower end of the lug base, and a thickness of the lug base is greater than a thickness of the lug plate body.

15. The vehicle according to claim 13, wherein an outer side surface of the anti-collision seat plate is integrally provided with a folded plate portion, the folded plate portion has a connecting through hole, an outer side surface of the mounting seat has a threaded hole, and the anti-collision seat plate is fastened to the mounting seat through a threaded piece which passes through the connecting through hole to be fitted in the threaded hole.

16. The vehicle according to claim 13, wherein the mounting seat comprises a mounting seat plate, a first suspension plate and a second suspension plate, the first suspension plate extends downwards from a side of the mounting seat plate, the second suspension plate extends downwards from another side of the mounting seat plate, the first suspension plate and the second suspension plate are spaced apart from and opposite to each other, the anti-collision lug plate is adjacent to the first suspension plate and extends substantially parallel to the first suspension plate.

17. The vehicle according to claim 13, wherein the first anti-collision seat comprises a connecting seat, a first lug plate, and a second lug plate, the connecting seat is connected to the step, an end of the first lug plate is connected to the connecting seat, an end of the second lug plate is connected to the connecting seat, the first lug plate and the second lug plate are opposite to and spaced apart from each other, a first end of the at least two anti-collision shafts is supported on the first lug plate, a second end of the at least two anti-collision shafts is supported on the second lug plate, and the at least two anti-collision shafts are spaced apart from each other along an extension direction of the first lug plate and the second lug plate.

18. The vehicle according to claim 17, wherein the electric step device further comprises a pressing plate, the pressing plate comprises a plate body and a first boss extending downwards from a lower surface of the plate body, the pressing plate has a first threaded hole running through the plate body and the first boss, an inner side of the step is provided with a connecting plate, the connecting plate has a first penetrating hole, the connecting seat has a first groove, a bottom wall of the first groove has a first through hole, the connecting plate is pressed on the connecting seat, the plate body is pressed on the connecting plate, the first boss passes through the first penetrating hole to be fitted in the first groove, and the pressing plate, the connecting seat and the step are fastened together by a threaded fastener which passes through the first through hole to be fitted in the first threaded hole.

* * * * *